3,141,838
RESINOUS COMPOSITIONS AND METHOD OF PREPARING THE SAME
William H. Snavely, Jr., and Peter J. Manno, Ponca City, Okla., assignors to Continental Oil Company, Ponca City, Okla., a corporation of Delaware
No Drawing. Filed Mar. 31, 1960, Ser. No. 18,809
4 Claims. (Cl. 204—158)

This invention relates to novel resinous compositions, methods of preparing the same, and more particularly it relates to the products formed by reacting a secondary alcohol with an organic chloride which reaction is induced by radiation.

Heretofore the preparation of resinous compositions employing an organic chloride specifically an aromatic chloride as a reactant has involved the reaction of that compound with a metal halide or a metal. Such methods have not been entirely satisfactory for a number of reasons. Generally, long reaction times have been required; and, furthermore, even with these long reaction periods, the reaction did not proceed to any substantial degree of completion. As another disadvantage, the final product was contaminated with the metallic compound, a result not always desired. In addition, the resin so produced was generally insoluble in all the usual solvents.

It is, therefore, a principal object of the present invention to provide a process for the preparation of resinous compositions employing an organic chloride as one of the reactants, which process obviates the disadvantages of the prior art processes.

Another object of our invention is to provide a process for the preparation of resinous compositions from an organic chloride and a secondary alcohol.

Yet another object of this invention is to provide new and useful products derived by a process involving the reaction of an organic chloride and a secondary alcohol which reaction is induced by radiation.

These and other objects and advantages of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, the foregoing objects and advantages are attained by a process which may briefly be stated as follows: A reaction mixture comprising a secondary alcohol and an organic chloride is subjected to radiation such as gamma radiation, after which the resinous composition is recovered from the reaction mixture.

Before proceeding with specific examples illustrating our invention, it may be well to indicate in general the nature of the materials required in the process.

Suitable alcohols include both secondary aliphatic and aromatic alcohols. Obviously, it is not necessary that all the hydrocarbon radicals of such alcohols be either aliphatic or aromatic. Although any of the alcohols listed below are satisfactory in our process, we generally prefer to employ the lower secondary aliphatic alcohols such as isopropyl alcohol, and secondary butyl alcohol. We prefer these alcohols, however, purely for economical and availability reasons. Polyhydroxy alcohols can also be employed. Among the aromatic alcohols which find use in the process of the invention are included benzyl alcohol, naphthyl carbinol and the like.

As to the organic chloride, we may employ either an aliphatic (carbon content of at least 3) chloride or an aromatic chloride. We wish to point out that, if an aliphatic alcohol is used, we of necessity must use an aromatic chloride, and conversely when an aromatic alcohol is employed an aliphatic chloride is used. Since the preferred alcohols are the aliphatic alcohols listed above, we generally prefer to employ benzyl chloride as the specific organic chloride. Other aromatic chlorides which can be used are $\alpha$-chloro compounds of the type, represented by $\alpha$-chlorotoluene. The aliphatic chlorides are preferably the alkyl chlorides, such as n-propyly chloride, isopropyl chloride, ethylene dichloride, butyl chloride, etc.

Gamma radiation is utilized for carrying out the invention. The reaction conditions employed can vary widely, depending on the particular reactants used and on the properties desired in the final reaction products. Usually the reaction is carried out at ordinary room temperatures; however temperatures varying from as low as minus 80° C. to as high as 200° C. can be employed if desired. The reaction pressure can also vary widely. In general, pressures from as low as atmospheric to as high as 1,500 p.s.i. or higher can be used. The reaction time can also vary widely, e.g., from a few minutes to as long as several hours or even days, depending on the particular reactants employed and the intensity of the gamma radiation. The radiation intensity can vary over a wide range, usually from about $1 \times 10^4$ to about $1 \times 10^7$ REPS per hour, more preferably from about $5 \times 10^4$ to about $1 \times 10^6$ REPS per hour. The ratios of the various components of the reaction systems can be varied to provide products having a gradation of specific properties and can be adjusted to provide materials having wide range properties, as desired for particular applications. Generally, we prefer to employ an excess of the alcohol; and after the reaction has proceeded to the desired degree, the source of radiation is removed and then the excess alcohol removed by evaporation.

In order to disclose the nature of the present invention still more clearly, the following illustrative example will be given. It is to be understood that the invention is not to be limited to the specific conditions or details set forth in this example except insofar as such limitations are specified in the appended claims.

*Example*

Forty ml. of isopropyl alcohol (0.52 mole) was mixed with 20 ml. of benzyl chloride (0.17 mole). The mixture was irradiated in a gamma field (from spent MTR fuel elements) to a total dosage of $5 \times 10^6$ REPS. Upon removal from the gamma field, the original water-white mixture was now pale yellow. The mixture was distilled at standard temperature and pressure. At 80° C. a cut of 15 ml. of isopropyl alcohol (0.2 mole) was obtained. Immediately upon the removal of the alcohol, a spontaneous resinification of the remaining mixture in the flask occurred. This was accompanied by a rapid expansion of vaporous hydrogen chloride through the distillation apparatus.

The resulting resin exhibited the following properties: Micro melting point 74–75° C., soluble in benzene and carbon tetrachloride, insoluble in n-hexane, acetone, and isopropyl alcohol; X-ray examination indicated it to be a noncrystalline plastic; and its infrared absorption spectrum was similar to polystyrene, but the bands were shifted to longer wavelengths. Results of the experiment indicated that the 0.32 mole of isopropyl alcohol reacted to yield a resin of 2:1 ratio of alcohol to halide.

The foregoing experiment was rerun in the absence of radiation. In this run, no resin was formed; and all of the alcohol used was recovered.

While we prefer to employ an organic chloride as one of the components because of the economics involved, our invention is not so limited as other halide including fluorides, bromides, and even the iodides may be used if desired.

While particular embodiments of the invention have been described, it will be understood, of course, that the invention is not limited thereto since many modifications may be made; and it is therefore contemplated to cover by the appended claims any such modifications as fall within the true spirit and scope of the invention.

We claim:

1. A method of forming a resinous composition which comprises subjecting to gamma radiation within the range of $1\times10^4$ to $1\times10^7$ REPS per hour in intensity a mixture consisting of an alcohol selected from the group consisting of secondary aliphatic alcohols and aromatic alcohols and an organic chloride selected from the group consisting of α-chlorinated aromatics and alkyl chlorides so that when the alcohol is aliphatic the chloride is aromatic, and vice versa, and then recovering the resinous composition from the reaction mixture.

2. The solid resinous product obtained by reaction of benzyl chloride with isopropyl alcohol in the presence of gamma radiation which is characterized by having a melting point of 74–75° C., by being soluble in benzene and carbon tetrachloride, and insoluble in n-hexane, acetone and isopropyl alcohol and by non-crystalline behavior under X-ray examination.

3. The method of claim 1 wherein the alcohol is isopropyl alcohol and the radiation intensity lies within the range of $5\times10^4$ to $1\times10^6$ REPS per hour.

4. The method of claim 3 wherein the organic halide is benzyl chloride.

References Cited in the file of this patent

UNITED STATES PATENTS

| | | |
|---|---|---|
| 2,700,736 | Roberts | Jan. 25, 1955 |
| 2,981,670 | Stoops et al. | Apr. 25, 1961 |